US012588646B2

(12) United States Patent
Eriksson

(10) Patent No.: US 12,588,646 B2
(45) Date of Patent: Mar. 31, 2026

(54) MILKING SYSTEM COMPRISING A MILKING ROBOT

(71) Applicant: DELAVAL HOLDING AB, Tumba (SE)

(72) Inventor: Andreas Eriksson, Tumba (SE)

(73) Assignee: DeLaval Holding AB, Tumba (SE)

( * ) Notice: Subject to any disclaimer, the term of this patent is extended or adjusted under 35 U.S.C. 154(b) by 147 days.

(21) Appl. No.: 18/550,894

(22) PCT Filed: Mar. 17, 2022

(86) PCT No.: PCT/SE2022/050254
§ 371 (c)(1),
(2) Date: Sep. 15, 2023

(87) PCT Pub. No.: WO2022/197233
PCT Pub. Date: Sep. 22, 2022

(65) Prior Publication Data
US 2024/0180118 A1 Jun. 6, 2024

(30) Foreign Application Priority Data

Mar. 18, 2021 (SE) .................................... 2150312-3

(51) Int. Cl.
*A01J 5/017* (2006.01)
*B25J 9/16* (2006.01)
(Continued)

(52) U.S. Cl.
CPC ........... *A01J 5/0175* (2013.01); *B25J 9/1679* (2013.01); *B25J 9/1697* (2013.01); *B25J 11/008* (2013.01); *B25J 13/08* (2013.01)

(58) Field of Classification Search
CPC ...... A01J 5/0175; B25J 9/1679; B25J 9/1697; B25J 11/008; B25J 13/08
See application file for complete search history.

(56) References Cited

U.S. PATENT DOCUMENTS 5,069,161 A * 12/1991 Pera ........................... A01J 5/08
119/14.47
2014/0000520 A1 1/2014 Bareket
(Continued)

FOREIGN PATENT DOCUMENTS

EP 1479290 A1 11/2004
WO 2005094565 A1 10/2005
(Continued)

OTHER PUBLICATIONS

International Search Report for PCT/SE2022/050254 mailed Jun. 10, 2022, 4 pages.
(Continued)

*Primary Examiner* — Adam R Mott
*Assistant Examiner* — Matthew C Gammon
(74) *Attorney, Agent, or Firm* — NIXON & VANDERHYE

(57) ABSTRACT

A milking system that includes milking cups, a milking robot with a robot arm configured to attach each of the milking cups to a respective teat, a sensor that detects two adjacent teats, and a control arrangement communicatively connected to the sensor and the robot arm, where the control arrangement is configured to determine a distance between the two adjacent teats, select one of the two adjacent teats to commence attachment of a first milking cup if the distance fulfils a distance criterion, and generate a command to the robot arm to commence the milking cup attachment to the selected teat.

7 Claims, 4 Drawing Sheets

(51) Int. Cl.
  *B25J 11/00*     (2006.01)
  *B25J 13/08*     (2006.01)

(56)           References Cited

U.S. PATENT DOCUMENTS

| | | | |
|---|---|---|---|
| 2019/0180092 A1 | 6/2019 | Foresman et al. | |
| 2019/0188820 A1* | 6/2019 | Foresman | A01J 5/0175 |
| 2019/0269096 A1* | 9/2019 | Pinsky | A01J 5/017 |

FOREIGN PATENT DOCUMENTS

| | | | |
|---|---|---|---|
| WO | 2014014341 A1 | 1/2014 | |
| WO | 2018007242 A1 | 1/2018 | |

OTHER PUBLICATIONS

Written Opinion of the ISA for PCT/SE2022/050254 mailed Jun. 10, 2022, 6 pages.
Swedish Search Report for SE2150312-3 mailed Oct. 18, 2021, 2 pages.

* cited by examiner

120b

120a

135a

130a

120b

120a

135a

130a

120b

120a

135a

130a

120b

120a

135a

130a

120b

120a

135a

130a

120a

120b

135a

130a

MILKING SYSTEM COMPRISING A MILKING ROBOT

CROSS-REFERENCE TO RELATED APPLICATIONS

This application is the U.S. national phase of International Application No. PCT/SE2022/050254 filed Mar. 17, 2022, which designated the U.S. and claims priority to SE 2150312-3 filed Mar. 18, 2021, the entire contents of each of which are hereby incorporated by reference.

TECHNICAL FIELD

This document discloses a milking system. More particularly, a milking system is disclosed comprising a milking robot, a sensor and a control arrangement. The control arrangement is configured to determine which animal teat to commence attachment of a first milking cup on, based on an estimation of a distance between two candidate teats. In case the distance between the teats exceeds a threshold limit, the milking cups are put on the teats in a predetermined order. In case the distance between the teats is smaller than the threshold limit, one of the teats is selected according to a special routine, thereby avoiding that two or more teats enter a mouthpiece of the milking cup simultaneously and get stuck therein.

BACKGROUND

On a dairy farm, milk is typically extracted from the animals by putting a milking cup/teat cup on each teat of the animal and apply milking vacuum under the tip of the teat, in addition to a pulsation vacuum.

A milking robot is often used for applying the milking cups onto the teats, based on sensor detections. The milking robot may have a robot arm configured to fetch the milking cups from a reservoir/magazine and attach them one after another onto a respective teat of the udder in a predetermined order.

For example, in case the robot arm is attaching the milking cups from between a forward leg and a rear leg of the animal, the first milking cup may be attached to the close side rear teat, thereafter the remote side rear teat, thereafter the close side frontal teat and last the remote side frontal teat. In other examples, the milking cups may be attached in another predetermined order.

In case the robot arm is attaching the milking cups from between the two rear legs of the animal, the first milking cup may be attached to the frontal teats and thereafter to the rear teats, for example; or vice versa.

However, sometimes two teats of the animal may be situated very close to each other, by genetic predisposition and/or due to a particular position/inclination of the animal. The two adjacent teats may then accidently enter the same milking cup, attracted by the under-pressure applied in the milking cup during attachment, thereby making milking impossible. Manual intervention by the farmer may be required (which is undesired and disturbing for the farmer); the throughput of animals at the robot will decrease and thereby also the total milk yield. In addition, the teats may be harmed by being squeezed into the same milking cup.

It would be desired through further investigations and development to evolve a concept for avoiding that more than one teat is allowed to enter one milking cup during attachment and thereby improve robotic milking.

SUMMARY

It is therefore an object of this invention to solve at least some of the above problems and facilitate robotic milking of animals, in particular attachment of milking cups on animal teats.

According to a first aspect of the invention, this objective is achieved by a milking system comprising a plurality of milking cups, each configured to fit on a respective teat of an animal during milk extraction. Also, the milking system comprises a milking robot with a robot arm configured to attach each of the milking cups to a respective teat. The milking system furthermore comprises a sensor configured to detect two adjacent teats. In addition, the milking system also comprises a control arrangement, communicatively connected to the sensor and the robot arm. The control arrangement is configured to determine a distance between the two adjacent teats, based on a sensor measurement made by the sensor. The control arrangement is also configured to select, if the determined distance fulfils a distance criterion, one of the two adjacent teats to commence attachment of a first milking cup. The control arrangement is also configured to generate a command to the robot arm, to commence attachment of the first milking cup to the selected teat.

By determine the distance between two adjacent teats, problematic teats situated too close to each other, i.e., within a threshold limit, are detected and a dedicated cautious routine could be applied when attaching the milking cups. It is hereby avoided that two adjacent teats are allowed to enter the same milking cup. The milking process of the milking robot is thereby favoured and facilitated. Undesired stops due to teats getting stuck into the same milking cup is avoided, which increases the throughput of animals at the milking robot. Thereby, disturbance of the milking process is decreased or even eliminated, which enhances the overall milk yield. Also, teat integrity of the animals is preserved, leading to less visits and treatment by veterinarians and enhanced animal delight.

In an implementation of the milking system according to the first aspect, the control arrangement may also be configured to generate a command to the robot arm to approach the detected two adjacent teats and in association with the movement of the robot arm, generate a command to the sensor to capture an image of the two adjacent teats. The control arrangement may also be configured to select one of the two adjacent teats based on the image of the sensor.

When the robot arm is moving towards the teats, the animal may change position (for example disturbed by the robot), leading to that teats may end up very close to each other, making it very problematic to attach the milking cup. By capturing an image when the robot arm is approaching the teats, an estimation of intra teat distance may be made just before attachment of the milking cup. Thus, the teat selection could be made just before attaching the milking cup, leading to that teat selection could be made taking last second animal movements into regard, yet enhancing the attachment process, further reducing the risk of jamming two teats into one milking cup.

In yet an implementation of the milking system according to the first aspect, or any implementation thereof, the image may be captured by the sensor at a distance smaller than a threshold limit distance from the two adjacent teats.

By capturing the image by the sensor at a distance shorter than the threshold limit, it may be assured that the image illustrates the situation just before the milking cup is to be attached to one of the teats and selection has to be made.

Thereby the robotic attachment process is enhanced, reducing the risk of jamming two teats into one milking cup.

In another implementation of the milking system according to the first aspect, or any implementation thereof, the sensor may be a 3D camera.

By using a 3D camera for capturing a teat image, the relations and distances between the teats could be reliably determined further enhancing the presented solution.

In another implementation of the milking system according to the first aspect, or any implementation thereof, the distance criterion may comprise a horizontal distance threshold limit.

The distance criterion used for detecting closely situated teats is hereby further specified.

In another implementation of the milking system according to the first aspect, or any implementation thereof, the control arrangement may also be configured to detect, when the determined distance fulfils the distance criterion, a vertical distance between a respective teat tip of the two adjacent teats. In addition, the control arrangement may also be configured to select the upper teat having the highest positioned teat tip in the vertical direction, for commencing attachment of the first milking cup.

By estimating vertical distance between teat tips of adjacent teats, an upper teat having the highest positioned teat tip in the vertical direction could be identified and selected for attachment commencement of the first milking cup.

In another implementation of the milking system according to the first aspect, or any implementation thereof, the control arrangement may also be configured to, when the upper teat having the highest positioned teat tip may be selected, generate a command to the robot arm, in order to utilise an outer part of the first milking cup, to remove the lower teat while attaching the first milking cup to the upper teat.

The outer part of the first milking cup is hereby specified to be used to exclude the lower teat from entering the mouthpiece of the milking cup, thereby ascertaining that it is avoided that two teats are jammed into one single milking cup.

In another implementation of the milking system according to the first aspect, or any implementation thereof, the control arrangement may also be configured to generate a command to the robot arm, in order to position the first milking cup below the selected upper teat, with a horizontal offset to the lower teat; move the first milking cup vertically, upwards, until reaching the height of the teat tip of the selected upper teat; place the first milking cup horizontally, centred under the teat tip of the selected upper teat; move the first milking cup vertically, upwards, while applying under-pressure in the first milking cup, until the first milking cup is attached to the selected upper teat; and release the first milking cup from the robot arm.

Hereby details of the attachment process are explained, when the upper teat is selected.

In another implementation of the milking system according to the first aspect, or any one or the first four implementation thereof, the control arrangement may also be configured to detect, when the determined distance fulfils the distance criterion, a vertical distance between a respective teat tip of the two adjacent teats; and select the lower teat having the lowest positioned teat tip in vertical direction, for commencing attachment of the first milking cup.

In some situations, it may be inconvenient to commence attaching the first milking cup to the upper teat. It may be out of reach for the robot arm for example, or an attempt of attaching the milking cup to the upper teat has failed. The lower teat may then be selected for commencing attachment of the first milking cup.

In another implementation of the milking system according to the first aspect, or the abovementioned implementation thereof, the control arrangement may also be configured to generate a command to the robot arm, in order to: approach the first milking cup to the selected lower teat while maintaining a horizontal offset to the upper teat; attach a mouthpiece of the first milking cup to the teat tip of the selected lower teat while moving the first milking cup horizontally away from the upper teat.

Hereby details of the attachment process is explained when the lower teat is selected.

In yet another implementation of the milking system according to the first aspect, or any implementation thereof wherein the lower teat has been selected, the control arrangement may also be configured to generate a command to the robot arm. The generated command aims at bringing the robot arm to position the first milking cup below the selected lower teat, with a horizontal offset to the upper teat. The command also aims at moving the first milking cup vertically, upwards, until capturing the teat tip of the selected lower teat into the mouthpiece of the first milking cup. Furthermore, the command also aims at moving the first milking cup horizontally, away from the position of the upper teat and moving the first milking cup vertically, upwards, while applying under-pressure in the first milking cup, until the first milking cup is attached to the selected lower teat. Furthermore, the generated command aims at bringing the robot arm to release the first milking cup from the robot arm.

Hereby details of the attachment process are explained, when the lower teat is selected.

In yet another implementation of the milking system according to the first aspect, or any implementation thereof, the control arrangement may also be configured to generate, if the determined distance does not fulfil the distance criterion, a command to the robot arm, to commence attachment of milking cups to one of the two adjacent teats in a predetermined order.

Thus, a rational solution is provided in milking cup attachment situations with generous space between the teats.

In yet another implementation of the milking system according to the first aspect, or any implementation thereof, the two adjacent teats comprise any one of the two rear teats, or the two front teats of the animal.

The terminology is hereby clarified, further reducing risks of misinterpretations.

Thanks to the provided solution, operation of the automated milking equipment is improved, and a pleasant treatment of the animal teats is provided. Advantages of the herein described embodiments is that wrongly attached teat cups and hurt teats are avoided, leading to a more efficient automatic milking in the milking robot and less veterinary interventions.

Less failure during milking cup attachment leads to less human supervision and intervention, enabling the farmer to focus on other aspects of animal welfare at the farm. By providing fast and reliable attachment of teat cups also when teats are situated very close to each other, more animals may be served by the milking robot leading to more milk extracted by the robot per time unit.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a milking system, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
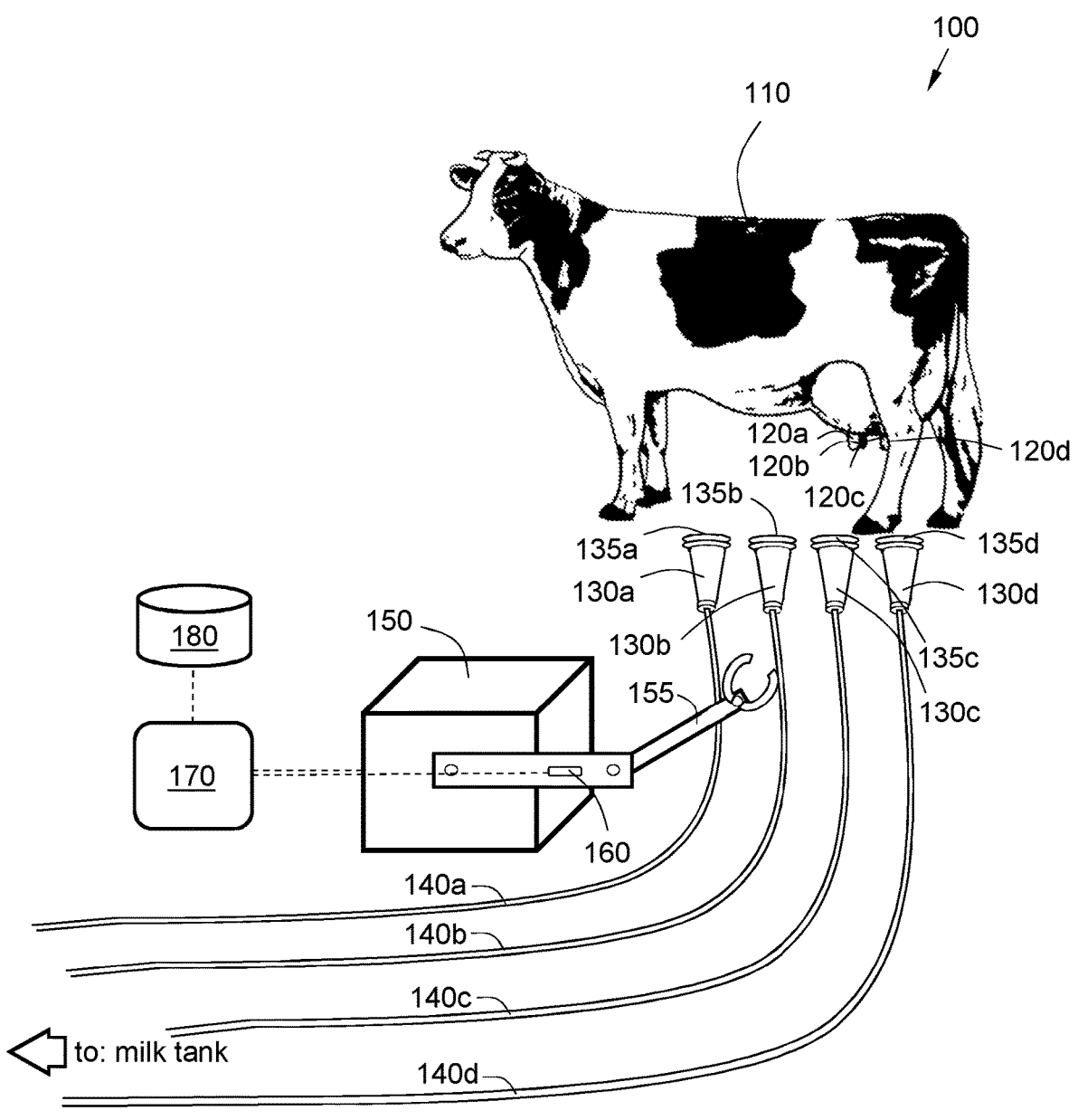
FIG. 1 illustrates an example of a milking system, according to an embodiment of the invention.

FIG. 1 illustrates a milking system 100 in a scenario wherein milk is extracted from an animal 110. The animal 110 may be comprised in a herd of animals for dairy farming at a farm. The milking system 100 may with advantage, although not necessarily, be implemented in an automatic milking facility arranged for voluntary milking of freely strolling animals 110, wherein the animals 110 may visit the milking facility/milk extracting system/milking system 100 in order to be milked when desired.

"Animal" may be any arbitrary type of domesticated female mammal such as e.g., cow, goat, sheep, camel, horse, dairy buffalo, donkey, yak, etc. The animal 110 may have four teats 120a, 120b, 120c, 120d, for example in the case of a cow. The teats 120a, 120b, 120c, 120d may then be subdivided into two adjacent rear teats 120c, 120d and two adjacent front teats 120a, 120b. Other kinds of animals may have other number of teats 120a, 120b, 120c, 120d, such as for example two teats (goats and/or sheep).

The milking system 100 may be configured to orchestrate the milking procedure comprising detecting teat positions, attachment of milking cups 130a, 130b, 130c, 130d, cleaning the teats 120a, 120b, 120c, 120d and evacuate the milk from the teats 120a, 120b, 120c, 120d via tubings to a milk tank, where it is stored.

The milking system 100 comprises a plurality of milking cups/teat cups 130a, 130b, 130c, 130d. The number of milking cups 130a, 130b, 130c, 130d is typically identical with the number of teats 120a, 120b, 120c, 120d of the animal 110 to be milked within the milking system 100. Each milking cup 130a, 130b, 130c, 130d comprises a respective mouthpiece 135a, 135b, 135c, 135d is configured to fit on a respective teat 120a, 120b, 120c, 120d of the animal 110 during milk extraction. A liner may be applied at each milking cup 130a, 130b, 130c, 130d, to ascertain good fit between the teat 120a, 120b, 120c, 120d and the milking cup 130a, 130b, 130c, 130d.

Each milking cup 130a, 130b, 130c, 130d is connected to a respective milk evacuation tube 140a, 140b, 140c, 140d, leading evacuated milk to a connected milk tank. The milk tank is in turn connected to a vacuum pump that has generated and/or continuously generates a vacuum pressure or milking vacuum within the milk tank. The vacuum pressure of the milk tank may thereby be maintained at a substantially constant level.

The expressions "vacuum pressure" and/or "milking vacuum" in the current context refers to the vacuum, or under-pressure in comparison with the environmental atmospheric pressure, used to extract milk from the teats 120a, 120b, 120c, 120d.

When a milking cup 130a, 130b, 130c, 130d is about to be attached/mounted on the respective teat 120a, 120b, 120c, 120d, an entry vacuum pressure may be applied, to enable the milking cup 130a, 130b, 130c, 130d to attach/stick on to the teat 120a, 120b, 120c, 120d and to start evacuating milk from the teat 120a, 120b, 120c, 120d. The entry vacuum pressure may be set to about 38-48 kPa, such as for example 45 kPa.

The milking system 100 also comprises a milking cup placing device such as a milking robot 150 with a robot arm 155. The milking robot 150 may be part of an Automatic Milking System (AMS), which sometimes also may be referred to as a Voluntary Milking System (VMS).

In addition, the milking system 100 comprises a control arrangement 170 such as a computer. The control arrangement 170 is communicatively connected to a sensor 160, such as a 3D camera, video camera, camera, lidar, radar, infrared camera, etc. The sensor 160 is configured to detect position of each teat 120a, 120b, 120c, 120d of the animal 110.

The control arrangement 170 may be communicatively connected to the sensor 160, via a wired or wireless connection, thereby obtaining information concerning the respective position of the animal teat 120a, 120b, 120c, 120d.

Figure 3A:
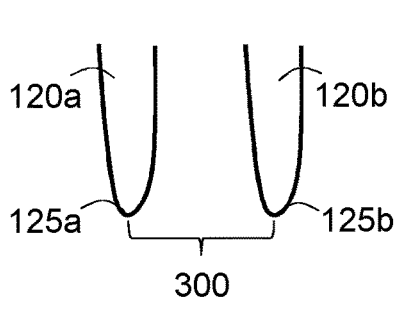
FIG. 3A illustrates two adjacent teats, in an example.
Figure 3B:
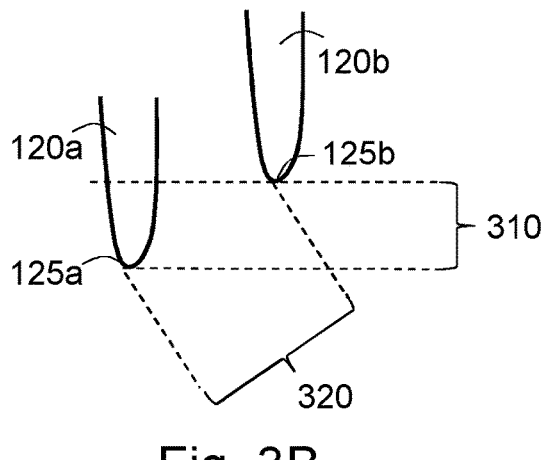
FIG. 3B illustrates two adjacent teats, in an example.

The control arrangement 170 is configured to determine a distance between the two adjacent teats 120a, 120b, 120c, 120d, based on a sensor measurement made by the sensor 160, such as an image. Some examples of intra teat distances are illustrated in FIGS. 3A-3B and discussed in the corresponding text segment. The distance may be determined between the respective teat tips in horizontal, and/or vertical direction, and/or directly. The control arrangement 170 is also configured to select, if the determined distance fulfils a distance criterion, one of the two adjacent teats 120a, 120b, 120c, 120d to commence attachment of the first milking cup 130a, 130b, 130c, 130d.

The distance criterion may be for example 0-40 mm in horizontal/direct direction in some embodiments. 0-60 mm in horizontal/direct direction in other embodiments, etc. (arbitrary, non-limiting examples).

The control arrangement 170 is also configured to generate a command to the robot arm 155 of the milking robot 150, to commence attachment of the first milking cup 130*a*, 130*b*, 130*c*, 130*d* to the selected teat 120*a*, 120*b*, 120*c*, 120*d*.

The control arrangement 170 may also comprise one or more instances of a processing circuit configured for performing various calculations for conducting the described method for attaching the first milking cup 130*a*, 130*b*, 130*c*, 130*d* to the selected teat 120*a*, 120*b*, 120*c*, 120*d*. The control arrangement 170 may also comprise a memory in some embodiments. The optional memory may comprise a physical device utilised to store data or programs, i.e., sequences of instructions, on a temporary or permanent basis. According to some embodiments, the memory may comprise integrated circuits comprising silicon-based transistors. The memory may comprise e.g., a memory card, a flash memory, a USB memory, a hard disc, or another similar volatile or non-volatile storage unit for storing data such as e.g., ROM (Read-Only Memory), PROM (Programmable Read-Only Memory), EPROM (Erasable PROM), EEPROM (Electrically Erasable PROM), etc. in different embodiments.

The milking robot 150, under control of the control arrangement 170 is configured to sequentially put each of the milking cups 130*a*, 130*b*, 130*c*, 130*d* onto the respective teat 120*a*, 120*b*, 120*c*, 120*d* of the animal 110, based on the sensor detections made by the sensor 160, in the order as selected by the control arrangement 170, i.e., in a non-predetermined order.

The milking cups 130*a*, 130*b*, 130*c*, 130*d* may be kept in a storage magazine or similar storage zone, where the robot arm 155 of the robot 150 may pick them up one at the time and place it onto one of the selected teats 120*a*, 120*b*, 120*c*, 120*d* and repeat this until all milking cups 130*a*, 130*b*, 130*c*, 130*d* have been mounted. In other embodiments however, the milking cups 130*a*, 130*b*, 130*c*, 130*d* may be permanently mounted on the robot arm 155.

In some embodiments, the control arrangement 170 may be configured to detect, when the determined distance between the two adjacent teats 120*a*, 120*b*, 120*c*, 120*d* fulfils the distance criterion, a vertical distance between a respective teat tip 125*a*, 125*b* of the two adjacent teats 120*a*, 120*b*, 120*c*, 120*d*. Based thereupon, the control arrangement 170 may then select the upper teat 120*a*, 120*b*, 120*c*, 120*d* having the highest positioned teat tip 125*a*, 125*b* in the vertical direction, for commencing attachment of the first milking cup 130*a*, 130*b*, 130*c*, 130*d*. The vertical distance may be a distance exceeding 5-10 mm in some arbitrary, non-limiting embodiments.

It has been observed that it is often easier to firstly put the first milking cup 130*a*, 130*b*, 130*c*, 130*d* on the upper teat 120*a*, 120*b*, 120*c*, 120*d* than on the lower teat 120*a*, 120*b*, 120*c*, 120*d*, and therefore it can be advantageous to select the upper teat 120*a*, 120*b*, 120*c*, 120*d* for commencing the milking cup attachment, when possible.

The control arrangement 170 is configured to, when the upper teat 120*a*, 120*b*, 120*c*, 120*d* having the highest positioned teat tip 125*a*, 125*b* is selected, generate a command to the robot arm 155 in order to utilise an outer part of the first milking cup 130*a*, 130*b*, 130*c*, 130*d*, to remove the lower teat 120*a*, 120*b*, 120*c*, 120*d* while attaching the first milking cup 130*a*, 130*b*, 130*c*, 130*d* to the upper teat 120*a*, 120*b*, 120*c*, 120*d*.

Thus, the outer part of the first milking cup 130*a*, 130*b*, 130*c*, 130*d* may be utilised to gently push away the lower teat while fitting the mouthpiece of the first milking cup 130*a*, 130*b*, 130*c*, 130*d* onto the selected upper teat 120*a*, 120*b*, 120*c*, 120*d*.

In some embodiments wherein the upper teat 120*a*, 120*b*, 120*c*, 120*d* has been selected, the control arrangement 170 may be configured to generate a command to the robot arm 155 to attach the first milking cup 130*a*, 130*b*, 130*c*, 130*d* onto the upper teat 120*a*, 120*b*, 120*c*, 120*d*. The generated command may comprise instructions for the robot arm 155 to position the first milking cup 130*a*, 130*b*, 130*c*, 130*d* below the selected upper teat 120*a*, 120*b*, 120*c*, 120*d*, with a horizontal offset to the lower teat 120*a*, 120*b*, 120*c*, 120*d*. Also, the generated command may comprise instructions for the robot arm 155 to move the first milking cup 130*a*, 130*b*, 130*c*, 130*d* vertically, upwards, until reaching the height of the teat tip 125*a*, 125*b* of the selected upper teat 120*a*, 120*b*, 120*c*, 120*d*. In further addition, the generated command may comprise instructions for the robot arm 155 to place the first milking cup 130*a*, 130*b*, 130*c*, 130*d* horizontally, centred under the teat tip 125*a*, 125*b* of the selected upper teat 120*a*, 120*b*, 120*c*, 120*d*. Furthermore, the command may also comprise instructions for the robot arm 155 to move the first milking cup 130*a*, 130*b*, 130*c*, 130*d* vertically, upwards, while applying under-pressure in the first milking cup 130*a*, 130*b*, 130*c*, 130*d*, until the first milking cup 130*a*, 130*b*, 130*c*, 130*d* is attached to the selected upper teat 120*a*, 120*b*, 120*c*, 120*d*. The generated command may furthermore comprise instructions for the robot arm 155 to release the first milking cup 130*a*, 130*b*, 130*c*, 130*d* from the robot arm 155.

Sometimes, it may be advantageous to instead start attaching the first milking cup 130*a*, 130*b*, 130*c*, 130*d* onto the lower teat 120*a*, 120*b*, 120*c*, 120*d*. The reason may be that the robot arm 155 cannot reach the upper teat 120*a*, 120*b*, 120*c*, 120*d*; an initial attempt to attach the first milking cup 130*a*, 130*b*, 130*c*, 130*d* onto the upper teat 120*a*, 120*b*, 120*c*, 120*d* has failed (independently of cause), etc. The position of the lower teat 120*a*, 120*b*, 120*c*, 120*d* (remote/close) in relation to the upper/other teat 120*a*, 120*b*, 120*c*, 120*d* may also influence the selection, i.e., selecting the closest teat first, as it probably is easier to attach the first milking cup 130*a*, 130*b*, 130*c*, 130*d* onto the closest teat 120*a*, 120*b*, 120*c*, 120*d*, also when it is lower positioned.

The control arrangement 170 may then be configured to detect, when the determined distance fulfils the distance criterion, a vertical distance between a respective teat tip 125*a*, 125*b* of the two adjacent teats 120*a*, 120*b*, 120*c*, 120*d*. The control arrangement 170 may then also be configured to select the lower teat 120*a*, 120*b*, 120*c*, 120*d* having the lowest positioned teat tip 125*a*, 125*b* in vertical direction, for commencing attachment of the first milking cup 130*a*, 130*b*, 130*c*, 130*d*.

In some embodiments, the control arrangement 170 may be configured to generate a command to the robot arm 155, in order to approach the first milking cup 130*a*, 130*b*, 130*c*, 130*d* to the selected lower teat 120*a*, 120*b*, 120*c*, 120*d* while maintaining a horizontal offset to the upper teat 120*a*, 120*b*, 120*c*, 120*d*. Also, the control arrangement 170 may furthermore be configured to attach a mouthpiece 135*a*, 135*b*, 135*c*, 135*d* of the first milking cup 130*a*, 130*b*, 130*c*, 130*d* to the teat tip 125*a*, 125*b* of the selected lower teat 120*a*, 120*b*, 120*c*, 120*d* while moving the first milking cup 130*a*, 130*b*, 130*c*, 130*d* horizontally away from the upper teat 120*a*, 120*b*, 120*c*, 120*d*.

The control arrangement 170, in yet some embodiments, may be configured to generate a command to the robot arm 155, in order to position the first milking cup 130*a*, 130*b*, 130*c*, 130*d* below the selected lower teat 120*a*, 120*b*, 120*c*, 120*d*, with a horizontal offset to the upper teat 120*a*, 120*b*, 120*c*, 120*d*. Also, the control arrangement 170 may in addition be configured to generate a command to the robot arm 155, in order to move the first milking cup 130*a*, 130*b*, 130*c*, 130*d* vertically, upwards, until capturing the teat tip 125*a*, 125*b* of the selected lower teat 120*a*, 120*b*, 120*c*, 120*d* into the mouthpiece 135*a*, 135*b*, 135*c*, 135*d* of the first milking cup 130*a*, 130*b*, 130*c*, 130*d*. The control arrange-ment 170 may also be configured to generate a command to the robot arm 155, in order to move the first milking cup 130*a*, 130*b*, 130*c*, 130*d* horizontally, away from the position of the upper teat 120*a*, 120*b*, 120*c*, 120*d*. Furthermore, the control arrangement 170 may also be configured to generate a command to the robot arm 155, in order to move the first milking cup 130*a*, 130*b*, 130*c*, 130*d* vertically, upwards, while applying under-pressure in the first milking cup 130*a*, 130*b*, 130*c*, 130*d*, until the first milking cup 130*a*, 130*b*, 130*c*, 130*d* is attached to the selected lower teat 120*a*, 120*b*, 120*c*, 120*d*. The control arrangement 170 may also be configured to generate a command to the robot arm 155, in order to release the first milking cup 130*a*, 130*b*, 130*c*, 130*d* from the robot arm 155.

Figure 2A:
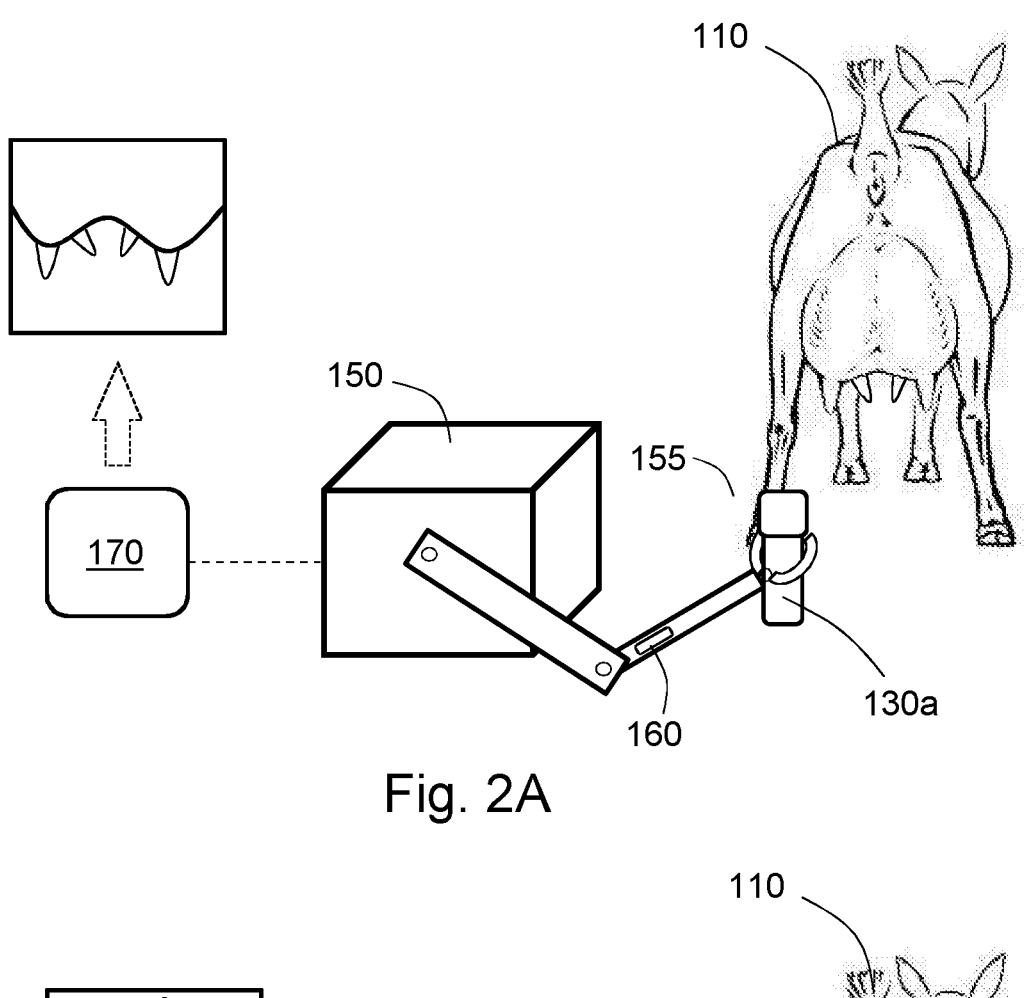
FIG. 2A illustrates an example of a milking robot and an animal wherein the robot arm is fetching a milking cup from a cup magazine.

FIG. 2A illustrates a scenario wherein a milking robot 150 with a robot arm 155 is catching a first milking cup 130*a*, to be applied on an animal teat 120*a*, 120*b*, 120*c*, 120*d* of an animal 110. In the illustrated example, the robot arm 155 is fetching the first milking cup 130*a* and approaches the animal udder from behind. In other embodiments, the milk-ing robot 150 and the robot arm 155 may approach the animal udder from the frontal and rear legs of the animal 110, or be operating under the animal 110.

The milking robot 150 comprises a sensor 160, which may be mounted on the robot 150, on the robot arm 155, or alternatively be mounted separately from the robot 150.

The sensor 160 may comprise e.g., a camera, a stereo camera, a 3D camera, a 3D scanner, a range camera, an infrared camera, a video camera, a radar, a lidar, a laser rangefinder, an ultrasound device, a Time-of-Flight camera, or similar device, in different embodiments.

A 3D camera is a sensor type that allows the perception of depth in images to replicate three dimensions as experi-enced through human binocular vision. Some 3D cameras may utilise two or more lenses to record multiple points of view, while others may utilise a single lens that shifts its position. The combination of the two perspectives, as with the slightly different perspective of two human eyes, is what makes depth perception possible.

With 3D photography, based on a 3D camera or any another appropriate sensor 160, it becomes possible to determine position in three dimensions of the animal teats 120*a*, 120*b*, 120*c*, 120*d*.

The sensor 160 is communicatively connected to the control arrangement 170, which is configured for image recognition/computer vision and object recognition, in par-ticular for detecting the teats 120*a*, 120*b*, 120*c*, 120*d* and their position.

Initially, as schematically illustrated in FIG. 2A, the sensor 160 may capture an image of the animal teats 120*a*, 120*b*, 120*c*, 120*d* of the animal 110. Based on this image, the robot arm 155, after having fetched the first milking cup 130*a* may be directed towards the udder.

Figure 2B:
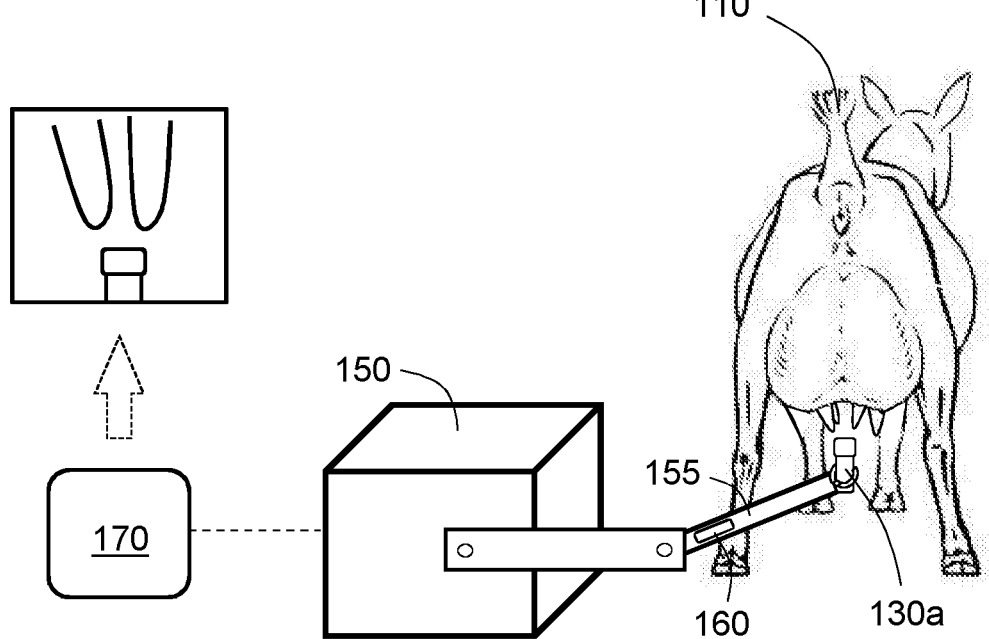
FIG. 2B illustrates an example of a milking robot and an animal wherein the robot arm is approaching two adjacent teats.

The control arrangement 170 may also be configured to generate a command to the robot arm 155 to approach the detected two adjacent teats 120*a*, 120*b*, 120*c*, 120*d* and in association with the movement of the robot arm 155, gen-erate a command to the sensor 160 to capture an image of the two adjacent teats 120*a*, 120*b*, 120*c*, 120*d*, as schematically illustrated in FIG. 2B.

By capturing an image/making a sensor detection briefly before the first milking cup 130*a* is to be attached to the teat

120*a*, 120*b*, 120*c*, 120*d*, it becomes possible for the control arrangement 170 to select which teat 120*a*, 120*b*, 120*c*, 120*d* of the two adjacent teats 120*a*, 120*b*, 120*c*, 120*d* to attach the first milking cup 130*a* on. The control arrangement 170 may thereby be configured to select one of the two adjacent teats 120*a*, 120*b*, 120*c*, 120*d* based on the image of the sensor 160.

The image may be captured by the sensor 160 at a distance smaller than a threshold limit distance from the two adjacent teats 120*a*, 120*b*, 120*c*, 120*d*. The threshold limit distance may be a distance wherein the sensor 160 is configured to focus on the two adjacent teats 120*a*, 120*b*, 120*c*, 120*d*.

The decision may thereby be made taking last minute movements of the animal 110 into account, thereby ascer-taining selection of the correct teat 120*a*, 120*b*, 120*c*, 120*d* according to the selection algorithm facilitating correct attachment of the first milking cup 130*a*, avoiding that both of the adjacent teats 120*a*, 120*b*, 120*c*, 120*d* are allowed to enter the first milking cup 130*a*.

FIG. 3A illustrates two adjacent teats 120*a*, 120*b* of an animal 110. Each adjacent teat 120*a*, 120*b* comprises a respective teat tip 125*a*, 125*b*.

FIG. 3A and FIG. 3B illustrates three examples of intra teat distances. FIG. 3A illustrates a horizontal distance 300 between the two adjacent teats 120*a*, 120*b*, which may be compared with a corresponding distance criterion.

FIG. 3B illustrates a vertical distance 310 between the two adjacent teats 120*a*, 120*b*, and a direct distance 320 between them, respectively. The vertical distance 310 may be esti-mated in vertical direction between the teat tips 125*a*, 125*b* of the two adjacent teats 120*a*, 120*b*.

The control arrangement 170 may be configured to, when the determined distance 300, 310, 320 does not fulfil the distance criterion, i.e., when the distance 300, 310, 320 between the two adjacent teats 120*a*, 120*b* exceeds a thresh-old limit, generate a command to the robot arm 155, to commence attachment of milking cups 130*a*, 130*b*, 130*c*, 130*d* to one of the two adjacent teats 120*a*, 120*b*, 120*c*, 120*d* in a predetermined order.

The predetermined order may in a non-limiting example be right front teat, left front teat, left rear teat and right rear teat, for example when the robot arm 155 is operating from between the rear legs of the animal 110. In other embodi-ments, for example when the milking robot 150 is operating from the left side, the predetermined order may be right rear teat, left rear teat, right front teat, left front teat, for example.

A particularly difficult situation may occur when two adjacent teats 120*a*, 120*b*, i.e., has an in-between horizontal distance 300 smaller than the distance criterion, while the vertical distance 310 between the teat tips 125*a*, 125*b* of the two adjacent teats 120*a*, 120*b* is nonexistent, or smaller than a vertical distance criterion. A particular selection of one of the two adjacent teats 120*a*, 120*b* may be made, for example by commencing putting the first milking cup 130*a*, 130*b*, 130*c*, 130*d* on the adjacent teat 120*a*, 120*b* which is easiest for the robot arm 155 to reach.

The particular methodology may comprise centering the mouthpiece 135*a*, 135*b*, 135*c*, 135*d* of the first milking cup 130*a*, 130*b*, 130*c*, 130*d* right under the selected teat 120*a*, 120*b*, slowly moving the first milking cup 130*a*, 130*b*, 130*c*, 130*d* upwards and then, when the teat tip 125*a*, 125*b* of the selected teat 120*a*, 120*b* is approached by the first milking cup 130*a*, 130*b*, 130*c*, 130*d* and attachment of the selected teat 120*a*, 120*b* is about to be made, gently moving the first milking cup 130*a*, 130*b*, 130*c*, 130*d* away from the other/ non-selected teat 120*a*, 120*b* while moving the first milking cup 130*a*, 130*b*, 130*c*, 130*d* upwards.

FIGS. 4A-4D illustrates a scenario wherein the upper teat 120*a*, 120*b* of the adjacent teats 120*a*, 120*b* is selected by the control arrangement 170 for commencing attachment of the first milking cup 130*a*, 130*b*, 130*c*, 130*d*.

Figure 4A:
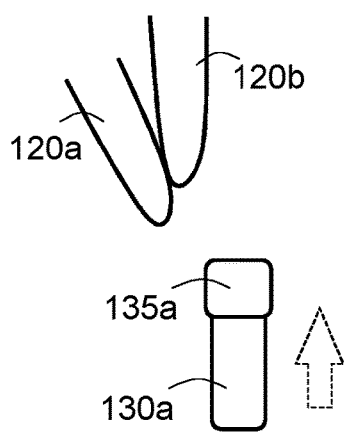
FIGS. 4A-4D illustrate two adjacent teats, in an example wherein a milking cup is attached to the upper teat.

Firstly, as illustrated in FIG. 4A, the robot arm 155 places the first milking cup 130*a* below the selected upper teat 120*b*, with a horizontal offset away from the other/lower teat 120*a*. Then, the first milking cup 130*a* may be gently moved upwards, vertically.

Figure 4B:
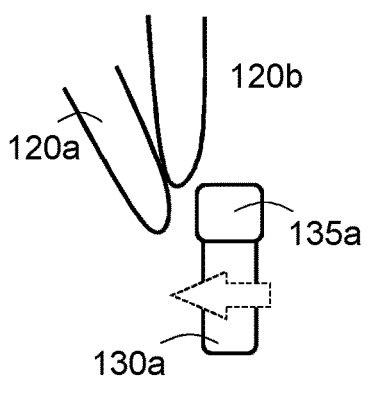

In FIG. 4B, the upper edge of the first milking cup 130*a*, after having been moved upwards in vertical direction, has reached approximately the same height as the upper teat 120*b*, yet maintaining the horizontal offset to the other/lower teat 120*a*. The teat tip 125*a* of the other/lower teat 120*a* is positioned lower than the upper cup edge of the first milking cup 130*a*. The first milking cup 130*a* is then centred under the upper teat 120*b*, thereby, if required, pushing away the lower teat 120*a* away with the mouthpiece 135*a* of the first milking cup 130*a*, as illustrated in FIG. 4C.

Figure 4C:
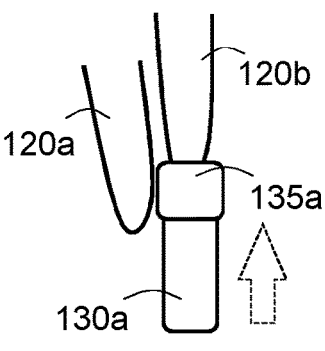

The first milking cup 130*a* is then centred under the upper teat 120*b*, thereby, if required, pushing away the lower teat 120*a* away with the mouthpiece 135*a* of the first milking cup 130*a*, as illustrated in FIG. 4C.

Figure 4D:
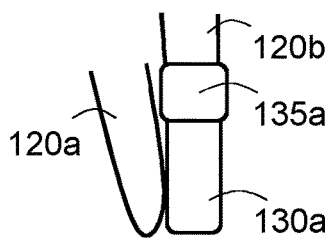

The first milking cup 130*a* may then be moved vertically upwards, attaching it to the upper teat 120*b* while the lower teat 120*a* is available outside the first milking cup 130*a*, as illustrated in FIG. 4D. The robot arm 155 may then release the first milking cup 130*a* and fetch the second milking cup 130*b*, starting an attachment procedure of the second milking cup 130*b* onto the lower teat 120*a*.

FIGS. 5A-5F illustrates an alternative scenario wherein the lower teat 120*a*, 120*b* of the adjacent teats 120*a*, 120*b* is selected by the control arrangement 170 for commencing attachment of the first milking cup 130*a*, 130*b*, 130*c*, 130*d*.

Figure 5A:
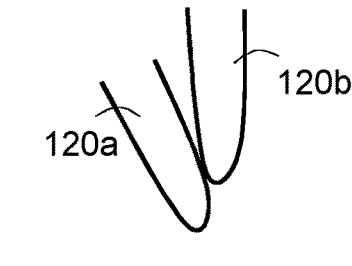
FIGS. 5A-5F illustrate two adjacent teats, in an example wherein a milking cup is attached to the lower teat.
Figure 5A:
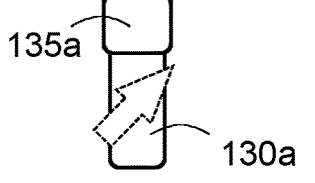

FIG. 5A illustrates the robot arm 155 placing the first milking cup 130*a* below the selected lower teat 120*a*, with a horizontal offset away from the other/upper teat 120*b*. Then, the first milking cup 130*a* may be gently moved upwards, vertically and sideways towards the teat tip 125*a* of the lower teat 120*a*.

Figure 5B:
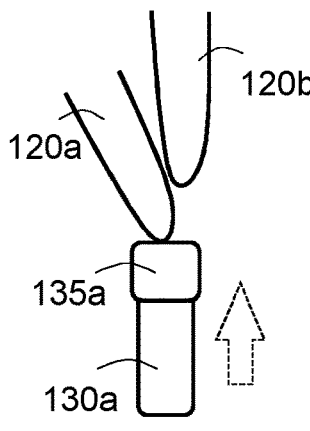
Figure 5C:
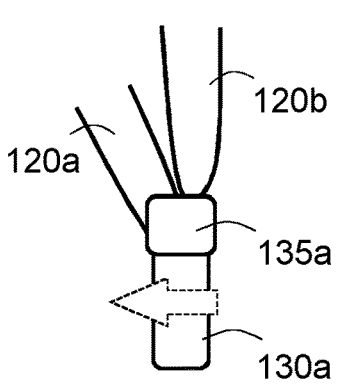
Figure 5D:
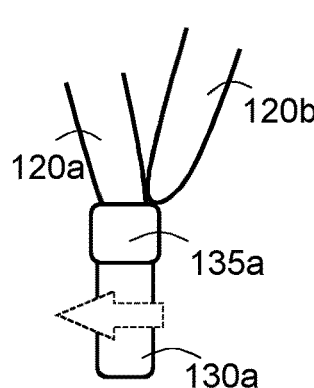
Figure 5E:
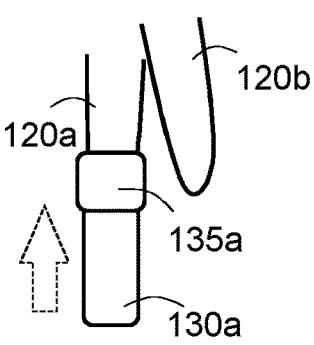
Figure 5F:
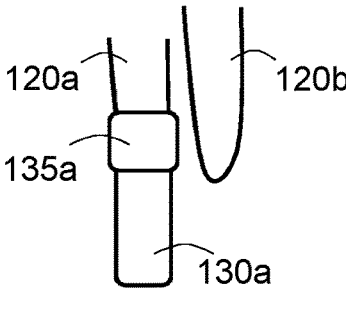

When the upper part of the first milking cup 130*a* is approaching the teat tip 125*a* of the lower teat 120*a*, the first milking cup 130*a* may be moved upwards, vertically, thereby capturing teat tip 125*a* of the lower teat 120*a* inside the mouthpiece 135*a* of the first milking cup 130*a* as illustrated in FIG. 5B. The first milking cup 130*a* may then be moved horizontally away from the upper teat 120*b*, in order to release it/avoid it being allowed to enter the mouthpiece 135*a* of the first milking cup 130*a*, see FIGS. 5C and 5D. When the upper teat 120*b* has been released and/or is confirmed to be outside the mouthpiece 135*a* of the first milking cup 130*a* as illustrated in FIG. 5E, the first milking cup 130*a* may be moved in vertical direction upwards, thereby attaching the lower teat 120*a* to the first milking cup 130*a*, see FIG. 5F. The robot arm 155 may then release the first milking cup 130*a* when having ascertained that the lower teat 120*a* is safely attached to the first milking cup 130*a*.

The robot arm 155 may then fetch the second milking cup 130*b* and attach it to the upper teat 120*b* according to a separate routine.

The above-described method to be performed by the control arrangement 170 may be implemented through the one or more processing circuits, together with a computer program for performing at least some of the functions of the described method steps. Thus, the computer program comprises instructions which, when the computer program is executed by the control arrangement 170 in the system, cause the control arrangement 170 to carry out the method steps.

The computer program mentioned above may be provided for instance in the form of a computer-readable medium, i.e. a data carrier carrying computer program code for performing at least some of the described method steps according to some embodiments when being loaded into the one or more processing circuits of the control arrangement 170. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control arrangement 170 remotely, e.g., over an Internet or an intranet connection.

The terminology used in the description of the embodiments as illustrated in the accompanying drawings is not intended to be limiting of the described method; the control arrangement 170; the computer program; the milking system 100 and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g., a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A milking system (100), comprising:
   a plurality of milking cups configured for placement on teats of an animal (110) during milk extraction;
   a milking robot (150) with a robot arm (155) configured to attach each one of the milking cups to a respective teat of the teats of the animal;
   a sensor (160) configured to detect two adjacent said teats of the animal; and
   a control arrangement (170), communicatively connected to the sensor (160) and the robot arm (155),
   wherein the control arrangement (170) is configured to:

determine a horizontal distance between the two adjacent teats, based on a measurement carried out by the sensor (160);

if the horizontal distance is less than a predetermined horizontal distance threshold limit:

determine a vertical distance between teat tips of the two adjacent teats based on the measurement carried out by the sensor;

identify as an upper teat one of the two adjacent teats whose said teat tip is above the teat tip of the other adjacent teat;

select the upper teat as a selected teat for attachment of a first of the plurality of milking cups; and generate a command to the robot arm (155) to commence attachment of the first milking cup to the selected teat by utilizing an outer part of the first milking cup to move a lower teat of the two adjacent teats while attaching the first milking cup to the upper teat, the lower teat being the other one of the two adjacent teats, thereby preventing the lower teat from entering a mouthpiece of the first milking cup.

2. The milking system (100) according to claim 1, wherein the control arrangement (170) is further configured to:

generate a command to the robot arm (155) to carry out a movement to approach the two adjacent teats, and in association with said movement generate a command to the sensor (160) to capture an image of the two adjacent teats, and wherein the selected teat is selected by the control arrangement (170) based on the image captured by the sensor (160).

3. The milking system (100) according to claim 2, wherein the image is captured by the sensor (160) at a distance smaller than a threshold limit distance from the two adjacent teats.

4. The milking system (100) according to claim 1, wherein the sensor (160) is a 3D camera.

5. The milking system (100) according to claim 1, wherein the control arrangement (170) is further configured to generate a command to the robot arm (155), in order to:

position the first milking cup below the selected upper teat, with a horizontal offset to the lower teat, move the first milking cup vertically upwards until reaching a height of the teat tip of the selected upper teat, place the first milking cup horizontally centered under the teat tip of the selected upper teat, move the first milking cup vertically upwards while applying under-pressure in the first milking cup, until the first milking cup is attached to the selected upper teat, and release the first milking cup from the robot arm (155).

6. The milking system (100) according to claim 1, wherein the control arrangement (170) is further configured to:

if the determined horizontal distance and the determined vertical distance do not fulfill a distance criterion, generate a command to the robot arm (155) to commence attachment of milking cups to one of the two adjacent teats in a predetermined order.

7. The milking system (100) according to claim 1, wherein the two adjacent teats comprise any one of two rear teats or two front teats of the animal (101).

\* \* \* \* \*